US009690762B1

(12) United States Patent
Mhatre (10) Patent No.: US 9,690,762 B1
(45) Date of Patent: Jun. 27, 2017

(54) MANIPULATING IMAGE CONTENT ITEMS THROUGH DETERMINATION AND APPLICATION OF MULTIPLE TRANSPARENCY VALUES TO VISUALLY MERGE WITH OTHER CONTENT AS PART OF A WEB PAGE

(71) Applicant: Google Inc., Mountain View, CA (US)

(72) Inventor: Amit Mhatre, Mountain View, CA (US)

(73) Assignee: Google Inc., Mountain View, CA (US)

( * ) Notice: Subject to any disclaimer, the term of this patent is extended or adjusted under 35 U.S.C. 154(b) by 612 days.

(21) Appl. No.: 13/740,846

(22) Filed: Jan. 14, 2013

(51) Int. Cl.
    *G06F 17/00* (2006.01)
    *G06F 17/22* (2006.01)
    *G06F 17/30* (2006.01)
    *G06F 17/21* (2006.01)
    *G06Q 30/02* (2012.01)

(52) U.S. Cl.
    CPC ........ *G06F 17/2247* (2013.01); *G06F 17/211* (2013.01); *G06F 17/3089* (2013.01); *G06Q 30/0277* (2013.01)

(58) Field of Classification Search
    CPC .............. G06F 17/2247; G06F 17/24; G06F 17/30899; G06F 17/3089; G06F 17/211; G06Q 30/0277; G06Q 30/0251; G06Q 30/0481
    USPC ........................................................ 715/234
    See application file for complete search history.

(56) References Cited

U.S. PATENT DOCUMENTS

| 6,337,925 | B1 * | 1/2002 | Cohen et al. ................. 382/199 |
| 6,542,157 | B1 * | 4/2003 | Browne ...................... 345/441 |
| 6,657,630 | B1 * | 12/2003 | Kurosawa et al. ........... 345/475 |
| 6,829,780 | B2 | 12/2004 | Kraft et al. |
| 7,339,597 | B1 * | 3/2008 | Bourdev et al. .............. 345/619 |
| 2002/0118875 | A1 * | 8/2002 | Wilensky ...................... 382/173 |
| 2002/0149581 | A1 * | 10/2002 | Furlong et al. ............... 345/419 |
| 2002/0194590 | A1 * | 12/2002 | Pong ........................ H04N 7/16 725/32 |
| 2006/0004630 | A1 * | 1/2006 | Criddle ................... G06Q 30/02 705/14.64 |
| 2007/0236475 | A1 * | 10/2007 | Wherry ........................ 345/173 |
| 2008/0249854 | A1 | 10/2008 | Patel et al. |
| 2009/0228802 | A1 | 9/2009 | Shan et al. |

(Continued)

OTHER PUBLICATIONS

Wempen, F.,"Microsoft Word 2010 in Depth," © Aug. 12, 2010, Que, Chapter 10: Working with Photos, pp. 379-414, 44 page total.*

(Continued)

*Primary Examiner* — Cesar Paula
*Assistant Examiner* — James H Blackwell
(74) *Attorney, Agent, or Firm* — Foley & Lardner LLP; John D. Lanza (57) ABSTRACT

Systems, methods performed by data processing apparatus and computer storage media encoded with computer programs for receiving content items, each of which is to be displayed upon request as a component of a page bearing other content, manipulating a visual appearance of at least one of the content items such that the content item is more likely to appear visually merged with other content when displayed as a component of a page bearing other content, and storing the manipulated at least one content item for subsequent display as a component of a page bearing other content.

15 Claims, 4 Drawing Sheets

(56) References Cited

U.S. PATENT DOCUMENTS

| | | | |
|---|---|---|---|
| 2009/0241054 A1* | 9/2009 | Hendricks | 715/776 |
| 2009/0317019 A1 | 12/2009 | Puliur | |
| 2010/0201879 A1* | 8/2010 | VanDuyn et al. | 348/565 |
| 2010/0275143 A1* | 10/2010 | Fu et al. | 715/768 |
| 2011/0072343 A1 | 3/2011 | Baciu et al. | |
| 2011/0313845 A1 | 12/2011 | Richardson et al. | |

OTHER PUBLICATIONS http://www.5metacom.com/documents/marketing_insights/nnarketing_insights-banner_blindness.pdf, "Solving the mystery of effective online banner advertising", Marketing Insights—Banner Blindness, 5MetaCom, 2008, 2 pages.

* cited by examiner

MANIPULATING IMAGE CONTENT ITEMS THROUGH DETERMINATION AND APPLICATION OF MULTIPLE TRANSPARENCY VALUES TO VISUALLY MERGE WITH OTHER CONTENT AS PART OF A WEB PAGE

BACKGROUND

This document relates to manipulating image content items (e.g., advertising images) to make them better visually merge with other content (e.g., text and/or graphics) presented to viewers in a display environment. Examples of display environments include electronic publications such as webpages accessible via a web browser application executing on a computer system that has connectivity with the Internet, on a point-of-sale kiosk, a dynamic billboard, a video stream, or, more generally, on any appropriate display in essentially any suitable context or environment.

Resource providers (e.g., publishers such as web site publishers) may include content such as content sponsoring in their respective publications to help financially support their operations. Some resource providers do not maintain a content sponsoring (e.g., advertising) infrastructure, and thus depend on third party content sponsor serving companies to recruit content sponsors and to serve content items to the resource providers' sites. Third party content sponsor serving companies can, depending on various factors, control which content items are displayed to which users and under what circumstances.

SUMMARY

This document describes technologies relating to modifying or otherwise manipulating image content items to make them better visually merge with other content presented to viewers in a display environment. Various implementations may include corresponding systems, apparatus, and computer programs, configured to perform the actions of the methods, encoded on computer storage devices.

In general, an aspect of the subject matter described in this specification may be embodied in systems, methods performed by data processing apparatus and articles (e.g., non-transitory computer storage media) encoded with computer programs that include the actions of receiving content items (e.g., advertisements), each of which is to be displayed upon request as a component of a page bearing other content (e.g., a webpage), manipulating a visual appearance of at least one of the content items such that the content item is more likely to appear visually merged with other content when displayed as a component of a page bearing other content, and storing the manipulated at least one content item for subsequent display as a component of a page bearing other content.

Manipulating the visual appearance may involve one or more of adding a transparency value to the at least one content item, varying transparency of the at least one content item to make the content item more transparent towards the edges and less transparent towards the center, adding a fuzzy border around the at least one content item, applying a corner inset effect to the at least one content item, and/or applying an inset effect along one or more edges of the at least one content item.

The actions described here may be performed as a pre-processing operation prior to receiving a request to serve a content item for display as a component of a page bearing other content. The actions may further involve receiving a request from a device to serve a content item for display at the requesting device as a component of a page bearing other content, and transmitting the manipulated at least one content item to the requesting device.

In general, another aspect of the subject matter described in this specification may be embodied in systems, methods performed by data processing apparatus and articles (e.g., non-transitory computer storage media) encoded with computer programs that include the actions of receiving a request to serve a content item for display as a component of a page bearing other content, in response to the request, manipulating a visual appearance of the content item based at least in part on one or more visual characteristics of the page bearing other content to make the content item appear visually merged with the page bearing other content, and transmitting the manipulated content item for display as a component of the page bearing other content.

Manipulating the visual appearance of the content item may involve varying a transparency value of the content item based on the one or more visual characteristics of the page bearing other content. The foregoing actions may be performed in real time.

One or more implementations of the subject matter described in this specification may be configured to realize various potential advantages. For example, the techniques described here may be employed to visually modify a content item (e.g., an image-based advertisement) such that is better visually merged with the other content along with which it is displayed and thus becomes less conspicuous and thus less likely to be ignored by the viewer, as typically may occur when a content item such as an image-based advertisement is displayed as a component of a presentation (e.g., webpage) bearing other content. In other words, the subject matter described here may help combat the problem of "banner blindness," which is generally defined as the natural tendency of a viewer to reflexively ignore content items such as image-based advertisements (sometimes referred to as "banner ads") that obviously are advertisements and not necessarily related to the other content of the presentation being displayed to the viewer. By making such content items appear less visually distinct and conspicuous, they tend to visually merge or blend in with the other content in the presentation, thereby reducing the likelihood that the viewer will automatically and reflexively skip over or otherwise ignore such content items.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The technologies described here may be implemented to provide an environment in which content sponsors (e.g., advertisers), for example, operating in conjunction with a content item serving company (e.g., an ad serving intermediary), may realize better viewership of their respective content items by making those content items appear to visually merge with other content being displayed in the same presentation. Although the following description largely draws upon examples in which the content items to be visually merged are image-based advertisements that are to be displayed as components of a page (e.g., webpage) or other presentation bearing other content, the subject matter and techniques described here may be advantageously applied in essentially any suitable context in which it is desirable to visually merge a content item with other content, for example, to make the content item less conspicuous and thus less likely to be ignored or over-looked by a viewer.

Example Operating Environment

Figure 1:
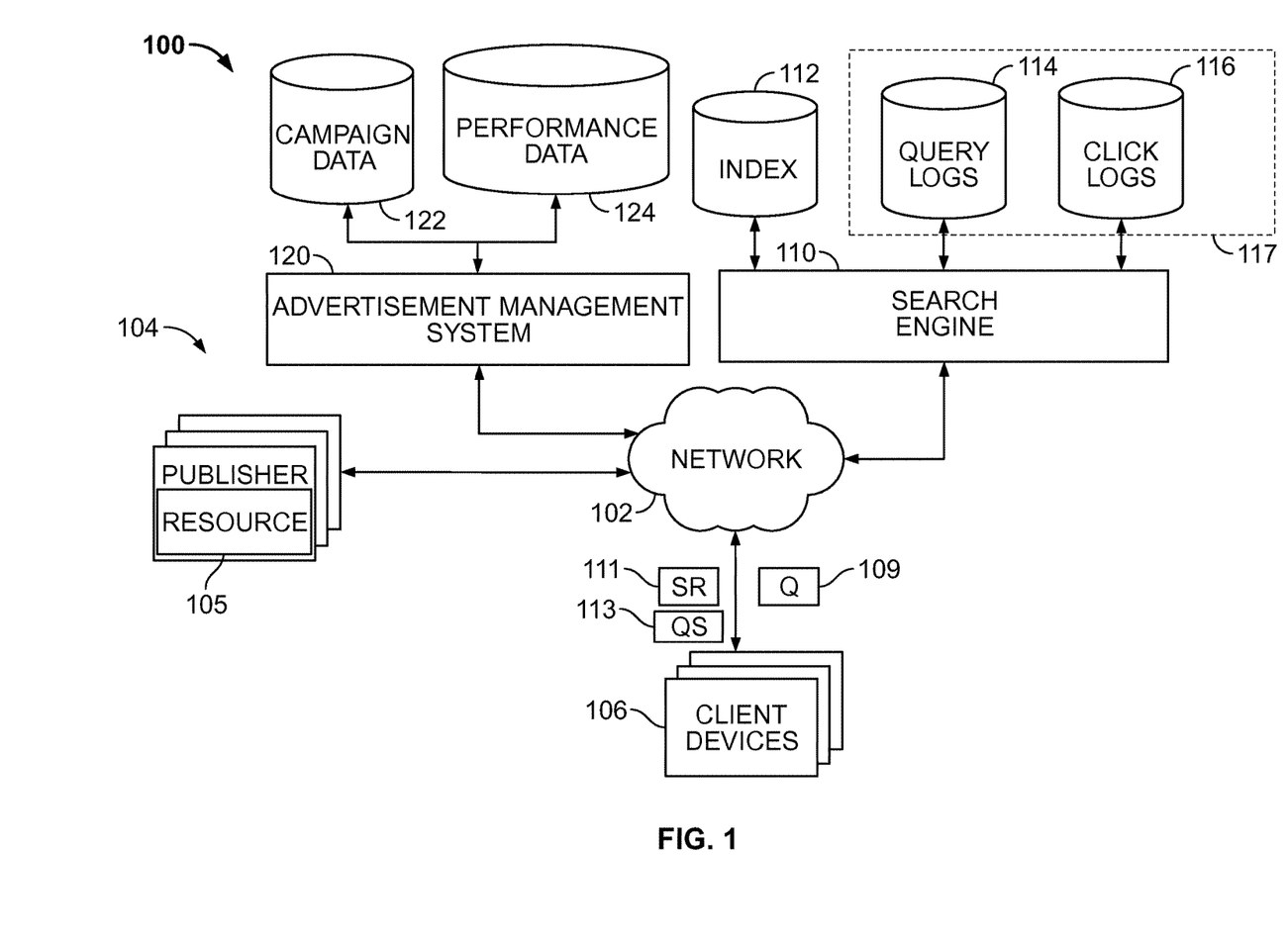
FIG. 1 shows an example environment in which a content item slot in a publication is reserved to receive and display a content item.

FIG. 1 is a block diagram of an example environment 100 in which various aspects of the subject matter described here may be implemented. A computer network 102, such as a local area network (LAN), wide area network (WAN), the Internet, or a combination thereof, connects resource provider web sites 104, user devices 106, and the search engine 110, and an advertisement management system 120. The online environment 100 may include many thousands of resource provider web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content resource provider, which is an entity that controls, manages and/or owns the website 104.

A resource is any data that can be provided by the resource provider 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the resource provider web sites 104 and indexing the resources provided by the resource provider web sites 104. The indexed and, optionally, cached copies of the resources, are stored in an index 112.

The user devices 106 submit search queries 109 to the search engine 110. The search queries 109 are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results 111 and returns the search results to the user devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The resource provider of the web site 104 hosting the resource receives the request for the resource from the user device 106 and provides the resource to the requesting user device 106.

In some implementations, the queries 109 submitted from user devices 106 are stored in query logs 114. Click data for the queries and the web pages referenced by the search results are stored in click logs 116. The query logs 114 and the click logs 116 define search history data 117 that include data from and related to previous search requests associated with unique identifiers. The click logs define actions taken responsive to search results provided by the search engine 110. The query logs 114 and click logs 116 can be used to map queries submitted by the user devices to web pages that were identified in search results and the actions taken by users (i.e., that data are associated with the identifiers from the search requests so that a search history for each identifier can be accessed). The click logs 116 and query logs 114 can thus be used by the search engine to determine the sequence of queries submitted by the user devices, the actions taken in response to the queries, and how often the queries are submitted.

The advertisement management system 120 facilitates the provisioning of content items with the resources 105. In particular, the advertisement management system 120 allows content sponsors to define rules that take into account attributes of the particular user to provide relevant content items for the users. Example rules include keyword rules, in which content sponsor provide bids for keywords that are present in either search queries or webpage content. Content items that are associated with keywords having bids that result in an advertisement slot being awarded in response to an auction are selected for displaying in the advertisement slots.

When a user of a user device 106 selects an advertisement, the user device 106 generates a request for a landing page of the advertisement, which is typically a webpage of the content sponsor. For example, the resource providers 104 may include content sponsors, each having hosting respective web pages, some of which are landing pages for the content items of the content sponsors.

These content items can be provided for many different resources, such as the resources 105 of the resource providers 104, and on a search results page resource. For example, a resource 105 from a resource provider 104 includes instructions that cause the user device to request content items from the advertisement management system 120. The request includes a resource provider identifier and, optionally, keyword identifiers related to the content of the resource 105. The advertisement management system 120, in turn, provides content items to the particular user device.

With respect to a search results page, the user device renders the search results page and sends a request to the advertisement management system 120, along with one or more keywords related to the query that the user provide to the search engine 110. The advertisement management system 120, in turn, provides content items to the particular user device.

The advertisement management system 120 includes a data storage system that stores campaign data 122 and performance data 124. The campaign data 122 stores content items, content serving information, and budgeting information for content sponsors. The performance data 124 stores data indicating the performance of the content items that are served. Such performance data can include, for example, click through rates for content items, the number of impressions for content items, and the number of conversions for content items. Other performance data can also be stored.

The campaign data 122 and the performance data 124 are used as input parameters to an advertisement auction. In particular, the advertisement management system 120, in response to each request for content items, conducts an auction to select content items that are provided in response to the request. The content items are ranked according to a score that, in some implementations, is proportional to a value based on an advertisement bid and one or more parameters specified in the performance data 124. The highest ranked content items resulting from the auction are selected and provided to the requesting user device.

Modifying Content Items to Facilitate Visual Merging

Figure 2A:
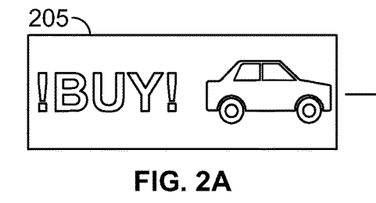
FIGS. 2A and 2B are, respectively, examples of an image-based content item and a page bearing other content in which the image-based content item is to be displayed as a component.
Figure 2B:
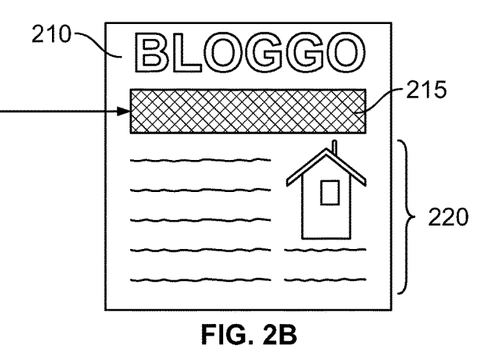

FIGS. 2A and 2B are, respectively, examples of an image-based content item 205 and a page 210 bearing other content in which the image-based content item is to be displayed as a component. In an implementation, the image-based content item 205 is a banner ad composed of text and graphics, often having various bright colors designed to capture a viewer's attention. In the context of a webpage presentation, when a viewer opens a web browser and navigates to a desired page 210, the publisher of that page 210 may have reserved a slot 215 for display of a content item (e.g., an image-based ad) to be provided by a content provider (e.g., advertiser) via a third party content providing company (e.g., ad serving company). Consequently, as the page 210 is being rendered by the web browser, the image-based content item 205 is retrieved from a remote location and displayed in slot 215 as a component of page 210, which as shown bears other content such as text and/or graphics.

Oftentimes, such image-based content items are intentionally designed to be brightly colored and conspicuous with the intent of capturing the viewer's attention and focus. But often that tactic backfires because many viewers have learned that many advertisements have common attributes (e.g., bright colors, punchy graphics) and, as a result, automatically ignore them when such banners ads or similar image-based content items are displayed on the page 210, thus resulting in a problem referred to as "banner blindness" (i.e., because a viewer ignores obvious, conspicuous banner ads, the viewer is regarded as being figuratively "blind" to such ads.).

Modifying an image-based content item such as banner ads to make it better visually merge with the content appearing on the page or other presentation in which the image-based content item is displayed as a component may help to alleviate the banner blindness problem. Accordingly, the following techniques for modifying image-based content items may make them appear visually less like advertisements and more like the other content on the page or other presentation on which the image-based contents are displayed as components. As a result, the image-based content items may be less likely to be ignored or otherwise overlooked thereby becoming potentially more valuable to the content item providers.

Figure 3A:
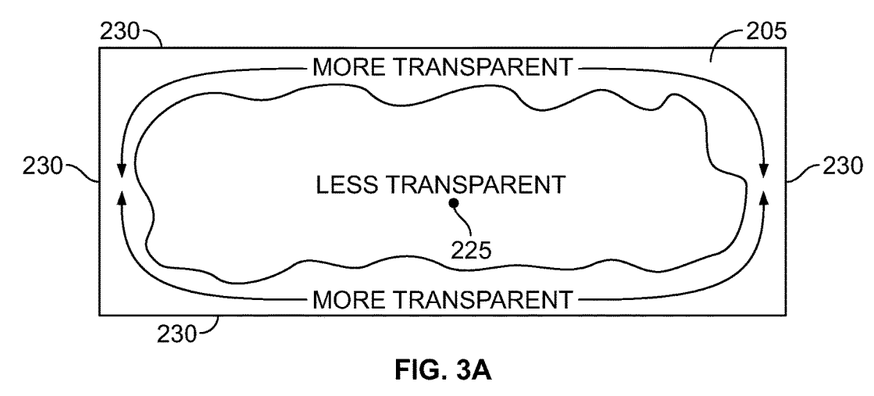
FIGS. 3A, 3B and 3C are examples of techniques for modifying an image-based content item to facilitate visual merging with other content.
Figure 3B:
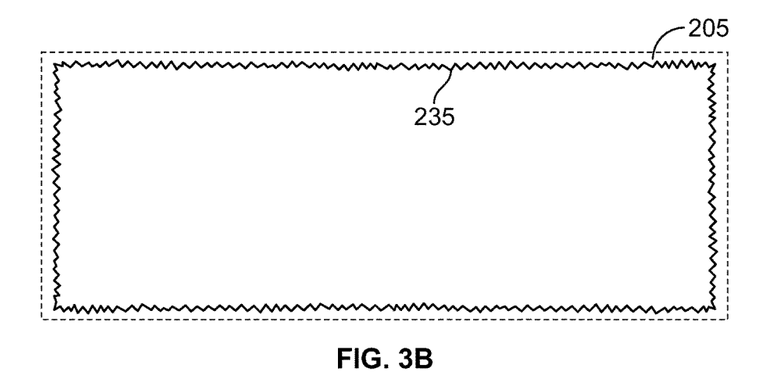
Figure 3C:
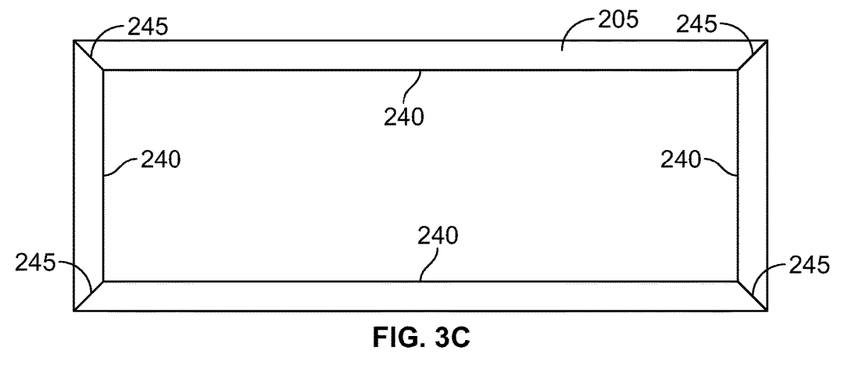

FIGS. 3A, 3B and 3C are examples of techniques for modifying an image-based content item 205 to facilitate visual merging with other content. In FIG. 3A, varying levels of transparency are applied to the image-based content item 205 to help it better visually merge with whatever page or presentation it subsequently is displayed as a component. For example, regions or areas near edges 230 of the content item 205 may be made more transparent (e.g., by applying a higher transparency value to the content item 205) while areas or regions near the center 225 of the content item 205 may be made or kept less transparent.

The variation in transparency from the center 225 to edges can be either linear or non-linear in nature, depending on desired effect, and can be either symmetrical or asymmetrical with regard to any arbitrary point or line with the content item, also depending on desired effect. And the extent of variation in transparency values applied to the content items can range from none at all (e.g., potentially at or near center region) to completely transparent. For example, appropriate transparency values can be applied to areas or regions at and/or near edges 230 to make them completely transparent, or nearly so, thereby creating a dissolve effect in which the background of the page bearing other content (in which the content item 205 is to be displayed as a component) will show through the content item's edge border regions and thereby blend in. In any case, adding a varying transparency to the content item 205 tends make the content item 205 appear less conspicuous (e.g., less obviously like an advertisement) when the content item 205, so modified, is displayed as a component of a page bearing other content, thereby decreasing the likelihood that a viewer of the page will instinctively or reflexively ignore the content item 205. Depending on specifics of the content item 205 and/or the page in which it is being displayed as a component, the effectiveness of this varying transparency technique may be higher with content items 205 that tend to have brighter, more vivid colors but potentially less so for content items 205 that have mostly pale or whitish looking colors.

Depending on implementation specifics, modification of the content item 205 can be performed either as a pre-processing step (e.g., ahead of time before a request is made for retrieval and display of the content item 205) and/or on a dynamic, real time basis—that is, modification of the content item 205 is performed after a request the content item is made but before the content item 205 is transmitted to the requesting entity for display. In the latter case (that is, modification of the content item 205 is performed in a dynamic, real time manner), the extent and variation of transparency to be applied to content item 205 can be based, at least in part, not only on characteristics of the content item 205 (e.g., colors included therein) but also on characteristics (e.g., background colors, text colors, layout, etc.) of the page bearing other content in which the content item 205 is to be displayed as a component. As a result, modification of the content item 205 can be tailored or customized to the particular page in which it is being displayed and thereby further potentially enhancing the visual merging benefits realized by such modification.

FIGS. 3B and 3C depict two other techniques for modifying a content item to better visually merge with other content. In FIG. 3B, a fuzzy border 235, for example, a border with intentional visual imperfections that appears to vary randomly in width by 1 to 4 pixels or so, can be applied to the content item 205 thereby giving it an appearance somewhat akin to a vintage photograph and/or being enveloped in a cloud. In FIG. 3C, an inset effect—either just in one or more corners 245 and/or along one or more entire edges 240—can be applied to the content item 205. Depending on characteristics of the content item 205 and other the other content along with which the content item 205 is being displayed, such effects may provide varying degrees of visually merging results and their corresponding benefits.

The inset effect of FIG. 3C potentially can be achieved using a Cascading Style Sheets ("CSS") drop shadow technique in which, for example, the content item 205 is modified such that, when displayed as a component of a page bearing other content, the content item 205 appears to be below or lower than its surrounding content. More generally, modifications that tend to make the content items appear visually more passive and/or less visually dominant may enhance the visual merging effect and resultant benefits.

The modification and visual merging techniques described here may find application and benefit not only with static content items but potentially also with dynamic content items, such as FLASH® based advertisements or the like. In general, the modification and visual merging techniques described here may tend to prove more effective with dynamic content items that do not include rapidly changing colors and/or other characteristics.

Figure 4A:
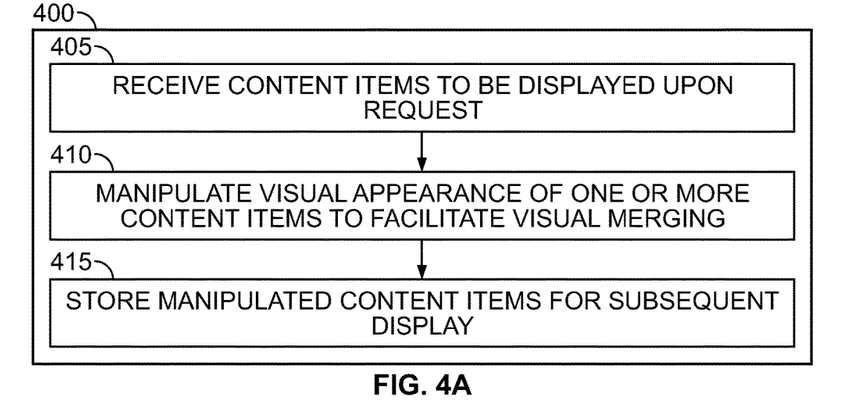
FIGS. 4A and 4B are flowcharts of example processes for manipulating content items to visually merge them with other content appearing in a page or other presentation.
Figure 4B:
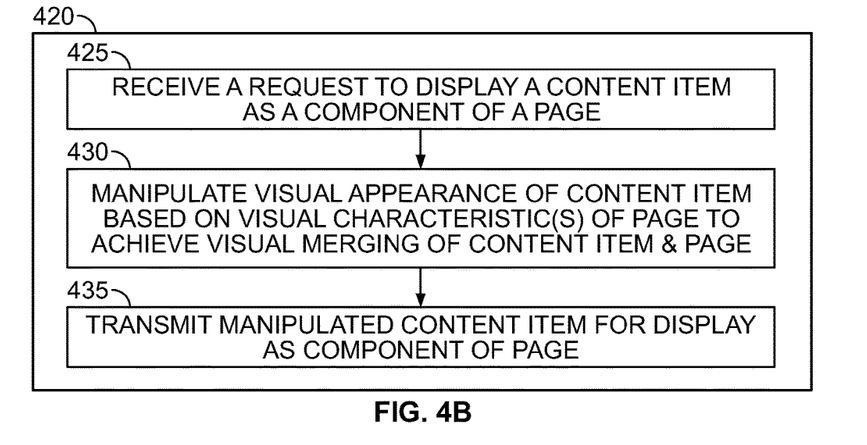

FIGS. 4A and 4B are flowcharts of example processes for manipulating or modifying content items to visually merge them with other content appearing in a page or other presentation. In process 400, data processing apparatus receives, at 405, one or more content items to be displayed upon request, e.g., in response to a request initiated by a web browser seeking an advertisement to display as a component in a webpage having a slot reserved for such advertisements. At 410, data processing apparatus modifies or otherwise manipulates the visual appearance of the received content items, e.g., by applying a transparency effect, to facilitate visual merging of the content items with pages in which they will subsequently be displayed. At 415, the modified content items are stored for subsequent display.

In process 420, data processing apparatus receives, at 425, a request, e.g., from a remote entity such as a web browser executing on a viewer's computer system, to display a content item as a component of a page bearing other content. At 430, the data processing apparatus manipulates—in a dynamic, real time (or near-real time) manner)—the visual appearance of a content item based at least in part on visual characteristics of the page in which the content item is to be displayed (and/or based on visual characteristics of the content item itself), thereby helping to ensure visual merging of the content item and the page bearing other content. At 435, the manipulated content item is transmitted to the requesting entity for display.

Additional Implementation Details

Figure 5:
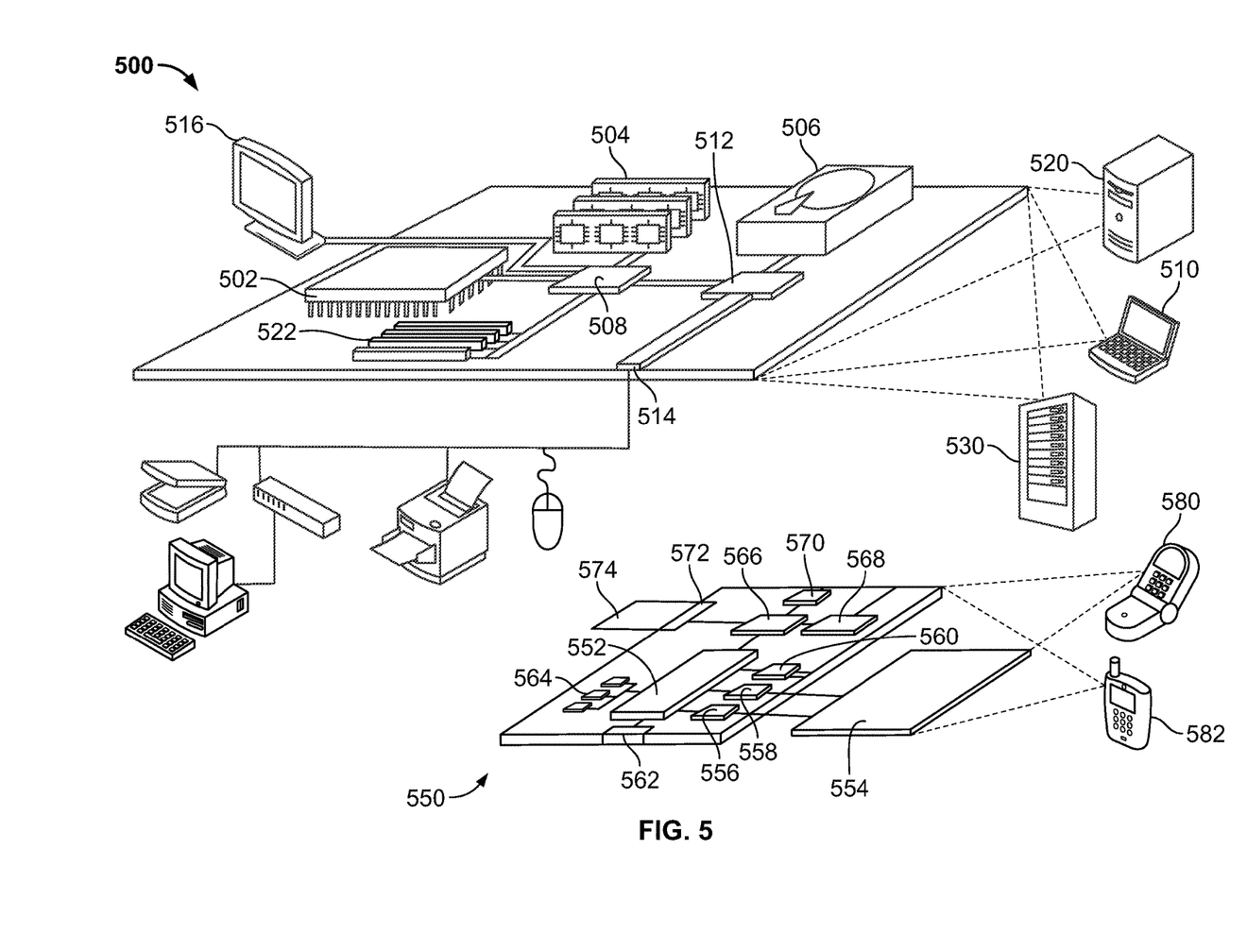
FIG. 5 shows an example of a computer device and a mobile computer device that can be used to implement the technologies described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 522, and a low speed interface 512 connecting to low speed bus 514 and storage device 506. Each of the components 502, 504, 506, 508, 522, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 522, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 530. In addition, it may be implemented in a personal computer such as a laptop computer 510. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments of the subject matter described herein. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

identifying, by a data processing system having one or more processors, a content item to be displayed upon request on resources;

determining one or more visual characteristics of the content item;

determining, based on the one or more visual characteristics of the content item, a first transparency value to apply to a first region of the content item towards edges of the content item and a second transparency value to apply to a second region of the content item towards a center of the content item relative to the first region, the first transparency value greater than the second transparency value;

modifying, by the data processing system, independent of a request to display the content item on a resource, a visual appearance of the content item to generate a first modified version of the content item such that the first modified version of the content item appears visually merged with other content of the resource when displayed along with the other content of the resource, the modifying the visual appearance of the content item including applying the first transparency level to the first region of the content item and applying the second transparency level to the second region of the content item to make the content item more transparent towards the edges and less transparent towards the center of the content item;

storing, by the data processing system, the first modified version of the content item in a memory of the data processing system for subsequent display along with content of one or more pages;

receiving, by the data processing system, a request from a device for content to display along with primary content of a web page, the request identifying the web page;

determining, by the data processing system, one or more visual characteristics of the web page;

retrieving, by the data processing system, responsive to receiving the request from the device, the first modified version of the content item from the memory of the data processing system;

modifying, by the data processing system, the first modified version of the content item based on the one or more visual characteristics of the web page and the one or more visual characteristics of the content item to generate a second modified version of the content item; and transmitting, by the data processing system, the second modified version of the content item to the device for display along with the primary content of the web page.

2. The method of claim 1, wherein the modifying the visual appearance further comprises adding a transparency value to the content item.

3. The method of claim 1, wherein the modifying the visual appearance further comprises adding a fuzzy border around the content item.

4. The method of claim 1, wherein the modifying the visual appearance further comprises applying a corner inset effect to the content item.

5. The method of claim 1, wherein the modifying the visual appearance further comprises applying an inset effect along one or more of the edges of the content item.

6. A non-transitory computer-readable medium storing instructions that when executed by a data processing apparatus cause the data processing apparatus to perform operations comprising:
 identifying a content item to be displayed upon request on resources;
 determining one or more visual characteristics of the content item;
 determining, based on the one or more visual characteristics of the content item, a first transparency value to apply to a first region of the content item towards edges of the content item and a second transparency value to apply to a second region of the content item towards a center of the content item relative to the first region, the first transparency value greater than the second transparency value;
 modifying, independent of a request to display the content item on a resource, a visual appearance of the content item to generate a first modified version of the content item such that the first modified version of the content item appears visually merged with other content of the resource when displayed along with the other content of the resource, the modifying the visual appearance of the content item including applying the first transparency level to the first region of the content item and applying the second transparency level to the second region of the content item to make the content item more transparent towards the edges and less transparent towards the center of the content item;
 storing the first modified version of the content item in a memory for subsequent display along with content of one or more pages;
 receiving a request from a device for content to display along with primary content of a web page, the request identifying the web page;
 determining one or more visual characteristics of the web page;
 retrieving, responsive to receiving the request from the device, the first modified version of the content item from the memory;
 modifying the first modified version of the content item based on the one or more visual characteristics of the web page and the one or more visual characteristics of the content item to generate a second modified version of the content item; and
 transmitting the second modified version of the content item to the device for display along with the primary content of the web page.

7. The non-transitory computer-readable medium of claim 6, wherein the modifying the visual appearance further comprises adding a transparency value to the content item.

8. The non-transitory computer-readable medium of claim 6, wherein the modifying the visual appearance further comprises adding a fuzzy border around the content item.

9. The non-transitory computer-readable medium of claim 6, wherein the modifying the visual appearance further comprises applying a corner inset effect to the content item.

10. The non-transitory computer-readable medium of claim 6, wherein the modifying the visual appearance further comprises applying an inset effect along one or more of the edges of the content item.

11. A system comprising:
 a processor configured to execute instructions;
 memory configured to store instructions for execution by the processor to cause the system to perform operations comprising:
  identifying a content item to be displayed upon request on resources;
  determining one or more visual characteristics of the content item;
  determining, based on the one or more visual characteristics of the content item, a first transparency value to apply to a first region of the content item towards edges of the content item and a second transparency value to apply to a second region of the content item towards a center of the content item relative to the first region, the first transparency value greater than the second transparency value;
  modifying, independent of a request to display the content item on a resource, a visual appearance of the content item to generate a first modified version of the content item such that the first modified version of the content item appears visually merged with other content of the resource when displayed along with the other content of the resource, the modifying the visual appearance of the content item including applying the first transparency level to the first region of the content item and applying the second transparency level to the second region of the content item to make the content item more transparent towards the edges and less transparent towards the center of the content item;
  storing the first modified version of the content item in the memory for subsequent display along with content of one or more pages;
  receiving a request from a device for content to display along with primary content of a web page, the request identifying the web page;
  determining one or more visual characteristics of the web page;
  retrieving, responsive to receiving the request from the device, the first modified version of the content item from the memory;
  modifying the first modified version of the content item based on the one or more visual characteristics of the web page and the one or more visual characteristics of the content item to generate a second modified version of the content item; and
  transmitting the second modified version of the content item to the device for display along with the primary content of the web page.

12. The system of claim 11, wherein the modifying the visual appearance further comprises adding a transparency value to the content item.

13. The system of claim 11, wherein the modifying the visual appearance further comprises adding a fuzzy border around the content item.

14. The system of claim 11, wherein the modifying the visual appearance further comprises applying a corner inset effect to the content item.

15. The system of claim 11, wherein the modifying the visual appearance further comprises applying an inset effect along one or more of the edges of the content item.

* * * * *